3,031,305
CORN DEGERMINATION PRETREATMENT

Laurence A. Weinecke, Peoria, Ill., assignor to the United States of America as represented by the Secretary of Agriculture
No Drawing. Filed Apr. 25, 1961, Ser. No. 105,517
1 Claim. (Cl. 99—80)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to an improvement in the process of treating whole corn kernals with dilute alkali prior to dry milling the thusly treated corn so as to obtain improved yields of the premium-return large grits and of corn oil.

More specifically, this invention comprises the unexpected discovery that a small but critical alteration in the prior art pre-milling treatment of corn permits a markedly improved separation of kernel components in a subsequent conventional mechanical degermination or other dry milling step and thus provides a very large increase in the yield of large unchecked grits as well as a lesser increase in the yield of corn germ and thus of corn oil therefrom. The large (−4+6 and −6+8) unchecked prime grits command premium prices from breakfast cereal manufacturers because only such grits can be heat-milled into corn flakes that meet the strong popular preferences for large flake-size coupled with a structural strength that prevents crumbling or breakage on handling and provides a crispness that retards the onset of sogginess in milk. Checked grits (those that are chipped or cracked) give undesirable flakes that are unable to stand transportation and handling without excessive crumbling or breakage and are esthetically objectionable. Grits having attached hull or germ residues likewise are esthetically objectionable in breakfast cereals. Since most of the smaller grits and those that are checked but are free of germ or hull go into cheaper breakfast cereals and to some extent into animal feeds, practically all grits having attached germ or hull components are sold at a considerable discount for animal feed and other nonpremium uses. The foregoing expressions "−4+6" and "−6+8" are terms well recognized in the corn processing art to mean a grit that passes through a sieve whose mesh per inch corresponds to the lower number but is retained on a a standard sieve having a mesh per inch corresponding to the larger of the two numbers.

The principal object of this invention is a modified pre-milling treatment of corn kernals that provides improved subsequent mechanical cleavage or release and separation of the tightly adherent corn hull and germ components from the grits. A further object is a modified pre-milling treatment which enables a subsequent mechanical dry milling or degermination to provide a truly astonishing increase in the yield of prime large grits coupled with a related reduction in the proportion of grits having attached germ or hull residues. Thus, since the grits obtained upon milling corn that has been pre-treated in accordance with my invention comprise a significantly lower proportion of germ-containing grits, the grits obtained have a lower oil content than corn grits obtained after treatment according to the prior art. A still further object is a pre-treatment which results in a more complete separation and recovery of the corn germ and thus permits a greater yield of corn oil. Other advantages and objects will become apparent to one skilled in the art.

I am aware that Hansen, U.S. Patent No. 2,472,971, broadly teaches that whole corn kernels be given a pre-treatment comprising a two-minute exposure to at least 0.2 percent caustic alkali solution at about at least 100° F. (38° C.) prior either to wet-milling or to dry-milling (degermination) of the treated kernels.

By the instant invention I have now discovered that a profoundly improved yield of prime large grits as well as a substantial increase in the yield of corn oil may be obtained by subjecting clean corn kernels, with agitation, to a tempering amount of cooled (65° F.) 0.1 percent solution of sodium hydroxide for two minutes, with or without a subsequent rinsing, prior to mechanical degermination in a commercial degerminator, attrition mill, dehuller, hammer mill, or the like. The surprisingly great improvement in the yields of premium components following the subsequent use, for example, of a modified Beall degerminator in which the outer (stationary) pyramidal studs have been filed down to truncated elevations that are only about half the original stud height, is indicated in the examples and in Table I.

EXAMPLE 1

A bushel of clean shelled dent corn kernels was placed in a revolving drum fitted with a stationary axially-disposed downwardly perforated spray tube, and 1,800 ml. of 0.1 percent sodium hydroxide solution at 65° F. (18° C.) was rapidly introduced. The drum was revolved for two minutes more. The corn was then immediately removed, rinsed by dipping once in plain water, and substantially freed of surface moisture by placing on a wire screen for 15 minutes before feeding to the modified Beall degerminator. There was obtained 22.4 lbs. of −4+6 grits of which only 4 percent were found to be checked, 0.5 percent had attached germ, and 0.9 percent had attached hull material. There was also obtained 4.1 lbs. of corn germ (embryo), which upon conventional pressing yielded 1.25 lbs. of oil.

By contrast, a bushel of the same corn which was processed in identical manner excepting for the substitution of a .2 percent solution of sodium hydroxide (for the 0.1 percent solution) and a temperature of 100° F. (for that of 65° F.) upon degermination yielded 19.0 lbs. of −4+6 grits of which 93 percent were found to be checked, 4.9 percent of the total had attached germ, and 7.5 percent had attached hull. There was also obtained 3.6 lbs. of germ, which on pressing yielded 0.95 lb. of oil.

Similarly, a bushel of corn kernals that was treated as was the last preceding sample excepting that the kernels were immersed for 2 minutes in 0.2 percent sodium hydroxide at 100° F. instead of being spray-dampened with the aqueous alkali and then were dried for 18 minutes without rinsing was degerminated in the previously described machine to give 18.3 lbs. of grits of which 76 percent were checked while 6.0 percent of the total had attached germ and 8.0 percent had attached hull. Also, there was obtained 3.5 lbs. of germ that on pressing yielded 0.9 lb. of oil. Thus, by difference it is seen that with my modification, 96 percent of the −4+6 grits are of premium quality (based on checked grits) as compared with only 24 percent and 7 percent respectively from degermination pretreatments suggested by the prior art. Also the degermination was improved to the extent that it permitted the recovery of up to 39 percent more oil.

EXAMPLE 2

Three replicates of the experimental conditions defined in the first paragraph of Example 1 gave the essentially consistent results tabulated in Table I.

Table I

| Replicate No. | Lbs. −4+6 grits | Lbs. germ | Lbs. oil (from germ) | Checked grits, percent | Percent having attached germ | Percent having attached hull |
|---|---|---|---|---|---|---|
| 1 | 22.0 | 4.0 | 1.23 | 6 | .9 | .95 |
| 2 | 22.9 | 4.3 | 1.30 | 5 | .8 | 1.0 |
| 3 | 22.3 | 3.9 | 1.27 | 3 | 1.0 | .80 |

Having disclosed my invention, I claim:

In the method of pretreating whole corn kernels by exposing the kernels to a dilute aqueous solution of alkali prior to mechanical degermination, the improvement comprising the step of wetting said kernels with a 0.1 percent aqueous solution of sodium hydroxide at 65° F. for 2 minutes.

References Cited in the file of this patent

UNITED STATES PATENTS 2,472,971    Hansen               June 14, 1949

FOREIGN PATENTS 266,736    Great Britain        Feb. 24, 1927